May 6, 1969   TAIZO ISHIDA   3,442,202
AUTOMATIC ROTISSERIE APPARATUS
Filed June 8, 1967
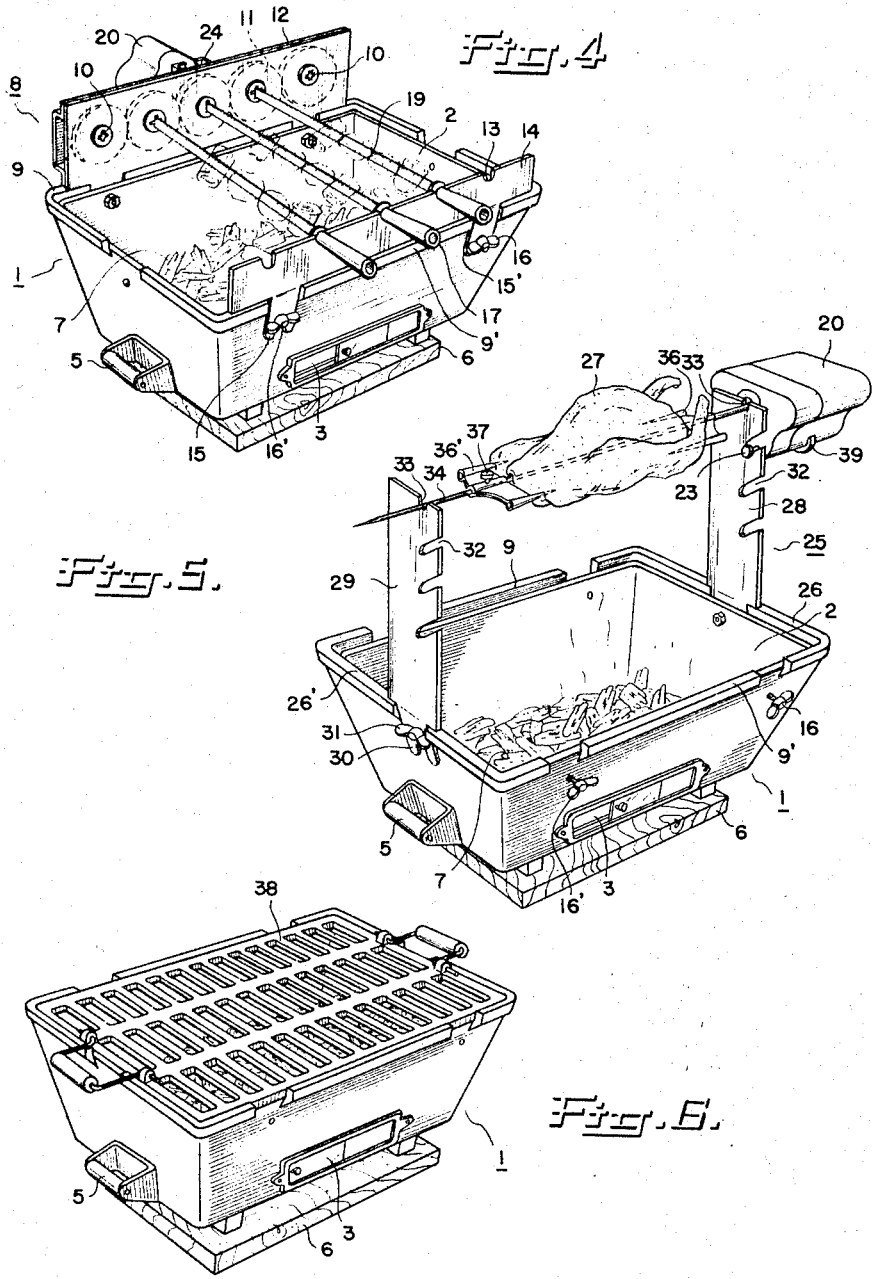

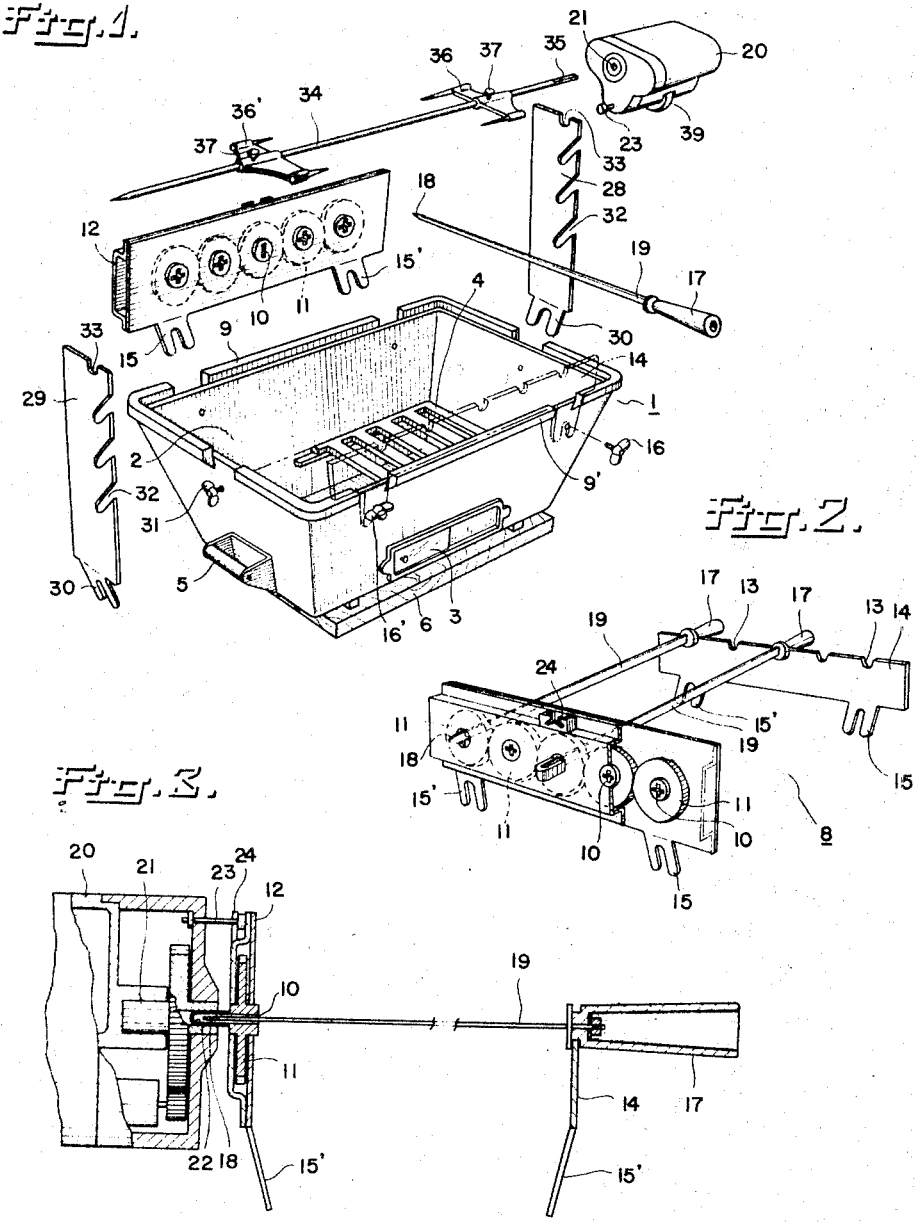

United States Patent Office 3,442,202
Patented May 6, 1969

3,442,202
AUTOMATIC ROTISSERIE APPARATUS
Taizo Ishida, 14 of 2, Tokiwa 4, Urawa-shi,
Saitama-ken, Japan
Filed June 8, 1967, Ser. No. 644,708
Claims priority, application Japan, Dec. 24, 1966,
41/84,373
Int. Cl. A47j 37/04; F24b 3/00
U.S. Cl. 99—421                                              4 Claims

ABSTRACT OF THE DISCLOSURE

An automatic rotisserie apparatus including a range having rotisserie attachments adapted to be placed thereon comprising a horizontal extending spit member support and a vertical extending spit member support. The horizontal extending split member support includes a plurality of interconnected rotating means and the vertical extending spit member support includes a plurality of positioning means permittng different vertical positions of the spit member.

---

This invention relates to apparatus for food cooking and more particularly to a food grill which can be readily equipped with rotisserie attachments.

The use of barbecue grills with rotisseries attached thereto is becoming increasingly popular and with this growth there is the need for a more versatile type of grill. Presently, the barbecue grills now in use limit the amount and kinds of food to be cooked because of the fixed arrangement of the rotisserie. Generally, only one spit member can be used at a time which severely limits the quantity of food which can be cooked.

Also, in the case of small barbecue grills such as hibachis, the use of a fixed rotisserie greatly adds to its size and thereby defeats the prime purpose of the hibachi which is ease of carrying with small storage space requirements.

Accordingly, it is an object of the invention to provide an automatic rotisserie apparatus including a range which is adapted to receive two sets of rotisserie members to enable a considerable amount of food to be cooked at one time.

Another object of the invention is to provide a range which can be readily used without any rotisserie members, or with one or two rotisseries attached thereto.

A further object of the present invention is to provide a range which is easily movable without any bulky rotisserie apparatus attached thereto and which then can be equipped with either one or two rotisserie devices.

According to the present invention, the foregoing and other objects are obtained by providing an automatic rotisserie apparatus which comprises a range adapted to contain a heat source, a first baking means, a second baking means, a plurality of spit members, and a plurality of electric motors adapted to be connected to the baking means to rotate the spit members. Each baking means is easily placed in use and they are each mutually independent of each other thereby permitting both baking means to be operable at the same time whereby substantial quantities of food can be cooked with the additional advantage of the meat juices from one baking means being co-mingled with the meat juices of the second baking means.

The objects, features, and advantages of this invention will be made more apparent by reference to the following specification taken in conjunction with the accompanying drawing in which:

FIG. 1 is an exploded perspective view of the automatic rotisserie apparatus of the present invention;

FIG. 2 is a perspective view of the first baking means of the above automatic rotisserie apparatus;

FIG. 3 is an axial sectional view of a spit member arranged in the first baking means and connected with an electric motor;

FIG. 4 is a perspective view showing the automatic rotisserie apparatus with only the first baking means FIG. 5 is a perspective view showing the automatic rotisserie with only the second baking means in use; and FIG. 6 is a perspective view showing the apparatus being used without either the first or second baking means.

Referring now more particularly to the drawings there is shown an automatic rotisserie apparatus having a range or fuel receptacle 1 with a rectangular opening 2, an adjustable air inlet 3 formed in the front wall thereof, a grate 4 removably arranged above the bottom of and within the range 1, a pair of knobs or handles 5 secured on the outer surfaces of the side walls of the range 1 for holding the same, and a base 6 arranged under and secured to the bottom wall of the range 1 by means of spacing feet. The heat source for the range is shown as charcoal 7 although other heat sources such as wood, gas, or electric coils may be utilized.

The first baking means 8 comprises a rear supporting plate 12 and a front supporting plate 14. These two supporting plates 12 and 14 are provided with bifurcated legs 15 ad 15' which are adapted to be engaged with recesses formed in the top outer flanges and then fixed on the outer surfaces of the rear wall edge 9 and the front wall edge 9', of the range 1 by means of wing bolts 16 and 16' which enter suitable threaded openings in the front and rear walls of range 1. The rear supporting plate 12 comprises a front wall and a rear wall, between which a series of, for example, five gears 11 are arranged in a horizontal row with adjacent gears engaged with one another. A boss on each of the gears 11 is rotatably journalled in the rear and front walls of the supporting plate 12 and is provided with an axial bore 10 having a non-circular cross-section. The front supporting plate 14 is provided with a number of slots 13 corresponding to the number of gears 11, such as for example, five slots 13 in the upper edge thereof. The slots 13 and axial bores 10 are arranged to receive and support a plurality of spit members 19 in a horizontal and parallel relationship.

Each spit member 19 includes a non-circular tip 18 and a handle 17. The tip 18 is adapted to be non-rotatably engaged in the axial bore 10 and the handle 17 is adapted to be rotatably supported in and by the slot 13 so that all the spit members 19 thus engaged with the rear supporting plate 12 and the front supporting plate 14 are rotated in unison by rotating any one of the gears 11. Although any one of the gears 11 may be rotated, as shown in FIGS. 2 and 3, the middle gear includes an extended boss 22 which is adapted to be detachably and rotatably connected with a shaft 21 of an electric motor 20. A protrusion 23 provided on the casing of the electric motor 20 is adapted to be anchored in a recess 24 formed in the top edge of the rear wall of the rear supporting plate 14. The connection of the electric motor shaft 21 with gear boss 22 and the connection of protrusion 23 with recess 24 insures that the electric motor is supported properly on the rear supporting plate 12 without the possibility of any undue rotation. Although only a non-rotatable connection is required between shaft 21 and boss 22, it is preferred to form the shaft 21 of a resilient plastic whereby a tight connection is insured.

The second baking means 25 comprises a pair of vertical supporting means, that is, a right-hand standard 28 and a left-hand standard 29. They are substantially mirror images of each other and they are provided with bifurcated legs 30, top notches 33, and front notches 32. The legs 30 are adapted to be engaged with recesses formed in the top outer flange and fixed on the outer surfaces of the right-hand wall edge 26 and the left hand wall edge 26' of the range 1 by means of wing bolts 31 which enter threaded openings in the side walls of range 1.

A spit member 34 is adapted to be rotatably supported by a pair of notches 33 or 32 depending on the particular height desired. An end of the spit 34 has a non-circular cross-section which is detachably connected with the shaft 21 of the electric motor 20 in the same manner as described in the first baking means 8. The protrusion 23 provided on the casing of the electric motor 20 is anchored in either the top notch 33 or a front notch 32 so that the electric motor 20 is supported properly in place and prevented from rotation. The spit member 34 is provided with a pair of adjustable pin members 36 and 36' for attachment to the food 27 being baked. The pin members 36 and 36' are rotatable on and slidable along the spit 34 but may be fixed thereto by means of set screws 37, respectively. A switch 39 may be utilized for controlling the motor 20 which is preferably a reversible type motor.

As will be appreciated, first baking means 8 and second baking means 25 are independent of each other and they may be used on the range 1 either singly or in combination. Additionally, if the baking means are not required for the particular food to be cooked, they need not be used at all and a grill 38 may be used on top of range 1.

What is claimed is:

1. An automatic rotisserie apparatus for cooking food on spit members, comprising:
    a range adapted to contain a heat source,
    a first baking means,
    a second baking means,
    a first electric motor associated with said first baking means,
    a second electric motor associated with said second baking means,
    said first baking means being attached to said range and provided with a plurality of interconnected rotating means,
    a plurality of parallel spit members in a horizontal plane above said range and received by said rotating means,
    said rotating means being driven by said first electric motor,
    said second baking means being attached to said range and including spit member support means adapted to support at least one spit member in a horizontal plane above the first-named horizontal plane and perpendicular to said spits received by said rotating means,
    said second electric motor adapted to be supported on said second baking means and connected to said supported spit member to rotate said spit member.

2. The automatic rotisserie appartus as recited in claim 1, wherein engaging means are provided on each of said baking means and said range for enabling easy placement and removal of said baking means on said range.

3. The automatic rotisserie appartus of claim 2 wherein said engaging means includes bifurcated leg portions on said baking means and a clamping member on said range, said clamping member adapted to clamp said leg portions to said range.

4. The automatic rotisserie apparatus as recited in claim 1, wherein said interconnected rotating means are gears, each of said gears having axial bosses with openings therein to receive one end of a spit member, and one of said gears has means thereon to be rotated by said motor.

References Cited

UNITED STATES PATENTS

| 2,388,831 | 11/1945 | Cramer. |
| 2,494,448 | 1/1950 | Nassif. |
| 2,505,976 | 5/1950 | Leon. |
| 2,521,220 | 9/1950 | Huntington. |
| 2,559,710 | 7/1951 | Danielson. |
| 2,577,963 | 12/1951 | Hagopian. |
| 2,715,870 | 8/1955 | Rutkowski. |
| 2,939,384 | 6/1960 | Vinson. |
| 3,013,550 | 12/1961 | Murchie. |
| 3,028,802 | 4/1962 | Schneider. |
| 3,361,055 | 1/1968 | Hondroulis. |

FOREIGN PATENTS

| 1,093,647 | 11/1954 | France. |
| 99,138 | 9/1898 | Gremany. |

ROBERT W. MICHELL, *Primary Examiner.*

JOHN M. NEARY, *Assistant Examiner.*

U.S. Cl. X.R.

126—25